3,093,688
PROCESS FOR PREPARING PHENOL
DIALCOHOLS
Stanley Kordzinski, Old Bridge, and Peter A. Yurcick, South River, N.J., assignors to Catalin Corporation of America, a corporation of Delaware
No Drawing. Filed Sept. 22, 1959, Ser. No. 841,464
5 Claims. (Cl. 260—609)

This invention relates to a process for preparing phenol dialcohols by reaction of a substituted phenol and formaldehyde in the presence of a volatile organic base.

We have discovered that if a phenol is blocked either directly or by steric hindrance so as to be substantially non-reactive in the position para to the hydroxyl group, it is possible to produce valuable di-alcohols which are usable and reactive for many purposes but which are substantially neutral, by reacting such a substituted phenol wiht a stoichiometric amount or excess of formaldehyde using as a catalyst a volatile organic base which is not reactive with formaldehyde. The fact that the para position of the phenol is blocked means that the reaction between the phenol and the formaldehyde is so controlled that cross linking is prevented. We have found that this permits us to heat the reaction mixture to a temperature at which the volatile organic base is driven off without having the resinous body transformed to the C or "set-up," cross linked stage. This greatly simplifies the procedure for the treatment can be carried on as a continuous heating through the reaction and the dehydration periods and the base catalyst will be driven off as an incident to the dehydration. No separate step of neutralization and removal of salts is required.

The organic base in accordance with the invention should be volatile at a temperature below that at which the reaction product decomposes. Usually, temperatures up to about 250° C. can be used. However, it is, of course, desirable to dehydrate the resin at as low a temperature as possible, and it is preferred therefore that the organic base be volatilizable at temperatures below about 150° C. under the conditions used for the dehydration. In order to be volatilizable in the manner required for the invention, the organic base should have a vapor pressure of at least 100 mm. at 150° C.

By "volatile" it is meant that organic base can be removed by heating. It will, of course, be understood that in many cases the base will not actually volatilize, but will decompose to form volatile decomposition products which are themselves removed. The mechanism by which the base volatilizes is not significant.

The stronger organic bases are preferred, because a lesser amount is required to maintain the alkalinity required for the condensation reaction. Some weak bases cannot be used because they are not capable of sufficiently elevating the pH.

The requirement that the base be nonreactive with formaldehyde limits the amines which should be used to tertiary amines. Trimethylamine, triethylamine, tributylamine, tripropylamine, triisopropylamine, triisobutylamine, tri-t-butylamine, butyldimethylamine, diethylmethylamine, and dimethylethylamine are exemplary of strong tertiary amine bases that can be employed. In general, any tertiary amine having up to about fifteen carbon atoms is useful. Higher amines are less volatile, and less alkaline than is desirable.

Quaternary ammonium hydroxides also can be used. These decompose at the dehydration temperature to give the corresponding tertiary amines and primary alcohols, which then volatilize. However, these bases are somewhat more expensive than the tertiary amines. Exemplary of this group of bases are tetraethyl quaternary ammonium hydroxide, tetramethyl quaternary ammonium hydroxide, tetrapropyl quaternary ammonium hydroxide, trimethyl isopropyl quaternary ammonium hydroxide, tetrabutyl quaternary ammonium hydroxide and trimethylethyl quaternary ammonium hydroxide. In general, any quaternary ammonium hydroxide giving a tertiary amine as defined above can be used.

The invention is applicable to the condensation with formaldehyde of any phenol which is so substituted that the para position is effectively blocked. Included in the class of phenols are the phenol sulfides. The phenol may have substituents in the phenol ring, such as halogen, and organic hydrocarbon radicals usually having from one to twenty carbon atoms such as alkyl, alkenyl, aryl, cycloalkyl and cycloalkenyl radicals. The hydroxymethyl derivatives of ortho and para-substituted alkyl phenols are employed as vulcanizing agents for rubber and form a class of phenols to which the invention is particularly applicable.

Exemplary are 2,6-dimethylol-4-tert-butyl phenol, 2,6-dimethylol-p-chlorophenol, 2,6-dimethylol - 4 - methyl phenol, 2,6-dimethylol-4-octyl phenol, 2,6-dimethylol-4-phenyl phenol, 2,6-dimethylol-4-benzyl phenol, 2,6-dimethylol-4-(alpha-dimethylbenzyl) phenol, 2,6-dimethylol-4-dodecyl phenol, and 2,6-dimethylol-4-cyclohexyl phenol.

It is not essential, of course, that the substituent be in the ortho or para position. It may also be in the meta position. However, as stated below the substituents must be such as substantially to block the para position.

The invention also is applicable to halogen substituted phenols such as p-chlorophenol, p-chloro-m-cresol, p-chloro-o-cresol, o-chloro-p-cresol and p-bromo-m-cresol, octyl phenol sulfide, p-chlorophenol sulfide and p-chloro-m-cresol sulfide.

Typical of the phenol sulfides are p-cresol sulfide, p-2-ethyl hexyl phenol sulfide, m-cresol sulfide, o-cresol sulfide, p-isohexyl phenol sulfide, p-2-ethyl cresol sulfide, and p-dodecyl phenol sulfide.

The condensation with formaldehyde results in the substitution of methylol groups on the phenyl radical of the phenol. These groups will enter at the ortho position. In addition, there may be condensation between phenyls by means of bridging methylene $CH_2$ radicals, forming linear chains of one or more phenol units, the end phenyl radicals containing terminal methylol groups. In producing linear polymers, it is important that the phenol be substituted at the para position so as to block that position, or the other substituents must be sufficient effectively to block the para position. In this case when we refer to a substituted phenol blocked as to the para position we intend to include both phenols that are directly blocked as to that position and those that are blocked sterically as explained above so as to prevent the formation of insoluble, infusible, three-dimensional cross-linked products.

The following are exemplary of the types of compounds which can be formed by the process of the invention:

(I)

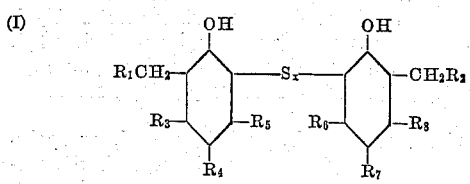

$R_1$ and $R_2$ are selected from the group consisting of hydroxyl OH, halogen X, ether OR and ester OOCR groups. $R_3$, $R_4$, $R_5$, $R_6$, $R_7$ and $R_8$ are selected from the group consisting of hydrogen and hydrocarbon radicals having from one to thirty carbon atoms, of which at least one R is an organic hydrocarbon radical, and when $R_4$ and $R_7$ are hydrogen, the remaining $R_3$, $R_5$, $R_6$, or $R_8$ radicals are of a size sufficient to sterically block the positions para to OH, so that when $R_3$ and $R_5$ are organic hydrocarbon radicals each R has at least three carbon atoms, and when one of $R_3$ and $R_5$ also is hydrogen the remaining R has at least four carbon atoms in a structure other than a straight aliphatic chain, and $x$ is a number from one to four. $R_1$ and $R_2$, and $R_3$, $R_4$, $R_5$, $R_6$, $R_7$ and $R_8$ may be the same or different.

There can also be used higher monomeric polycyclic phenol sulfides of the type:

(II)
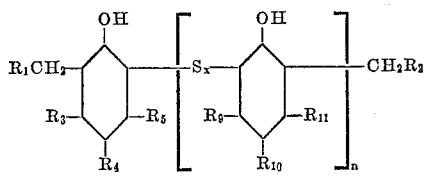

where $n$ represents the number of such units in the chain, from 1 to about 6, and the R's are as above. $R_9$, $R_{10}$ and $R_{11}$ are as defined above under $R_3$, $R_4$, $R_5$, $R_6$, $R_7$ and $R_8$.

(III)
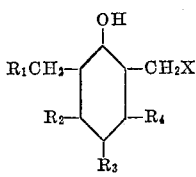

$R_1$ is selected from the group consisting of hydroxyl OH, ether $OR_5$ and ester $OOCR_6$.

$R_2$, $R_3$ and $R_4$ are selected from the group consisting of hydrogen and organic hydrocarbon radicals having from one to thirty carbon atoms, of which at least one R is an organic hydrocarbon radical, and when $R_3$ is hydrogen, the remaining R radicals are of a size sufficient to sterically block the $R_3$ position para to OH, so that when both $R_2$ and $R_4$ are organic hydrocarbon radicals each R has at least three carbon atoms, and when one of $R_2$ and $R_4$ also is hydrogen the remaining R has at least four carbon atoms in a structure other than a straight aliphatic chain.

X is halogen, such as fluorine, chlorine or bromine, and the molar ratio $CH_2R_1/CH_2X$ is within the range from about 0.2 to about 10, preferably from 0.35 to 2.5.

These compounds readily polymerize to form linear polymers having the general structure:

(IV)
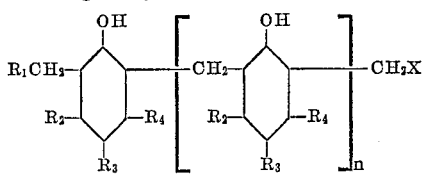

wherein $n$ is a number representing the number of units enclosed by the brackets in the chain, $R_1$ and X are as before, in (III), and $R_2$, $R_3$ and $R_4$ correspond to $R_2$, $R_3$ and $R_4$ in III.

The $R_2$, $R_3$ and $R_4$ groups in IV may be the same or different.

In the $R_1$ ester and ether groups of the type $R_5O$ and $R_6COO$, $R_5$ and $R_6$ can be any straight or branched saturated or unsaturated aliphatic hydrocarbon radical having from one to about eighteen carbon atoms. Typical $R_5$ and $R_6$ groups are, for example, methyl, ethyl, propyl, isopropyl, butyl, tert-butyl, sec-butyl, amyl, nonyl, undecyl, tridecyl, pentadecyl, heptadecyl, oleyl, octadecyl, and hexenyl.

$R_2$, $R_3$ and $R_4$ can be alkyl, alkylene, aryl, or cycloalkyl, for example, propyl, isopropyl, butyl, isobutyl, sec-butyl, t-butyl, amyl, isoamyl, t-amyl, hexyl, heptyl, octyl, 2-ethyl hexyl, isooctyl, tert-octyl, nonyl, isononyl, dodecyl, propenyl, hexenyl, octenyl, oleyl, decenyl, eicosyl, phenyl, benzyl, α-methyl benzyl, dimethylbenzyl, dimethylphenyl, xylyl, cyclohexyl, cyclopentyl and naphthyl.

The $R_2$, $R_3$ and $R_4$ and $CH_2R$ or $CH_2X$ radicals attached to the benzene ring in (III) and (IV) may have any position in the ring, other than as shown in (III) and (IV), provided that in each ring a $CH_2R$ or $CH_2X$ group is ortho to the hydroxyl group, and the positions ortho and para to the hydroxyl are blocked by $CH_2R$, $CH_2X$ or an $R_3$, $R_4$ or $R_5$ hydrocarbon group. In the preferred compounds, the $CH_2R$ and $CH_2X$ groups occupy the 2- and 6-positions as shown, and $R_3$ is a hydrocarbon group.

When $n$ is 0 in IV above, the compound is the monomer (III). When $n$ is 1, the compound is a dimer, and so forth. The methylene bridge between phenol units in IV results from the elimination of $H_2O$ and the joining of a $CH_2OH$ group on one unit to the benzene ring of another unit not yet containing a $CH_2OH$ group:

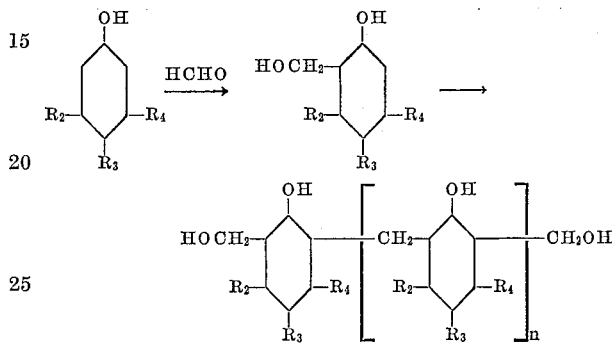

The above compounds in monomeric or polymeric form can self-condense to form higher polymers of the same general formula by elimination of HX (from $CH_2X$), ROH (from $CH_2OR$ and $CH_2OH$) and HOOCR (from $CH_2OOCR$). In a very minor proportion, ether linkages of the types $—CH_2—O—CH_2—$ may form between phenol nuclei.

(V)
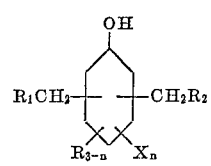

$R_1$ and $R_2$ are selected from the group consisting of hydroxyl OH, halogen $X_1$ and $X_2$, ether $OR_3$ and $OR_4$ and ester $OOCR_5$ and $OOCR_6$.

R is selected from the group consisting of hydrogen and organic hydrocarbon radicals having from one to thirty carbon atoms.

X is halogen, such as fluorine, chlorine or bromine.

$n$ is a number from 1 to 3.

R, $CH_2R_1$, $CH_2R_2$ and X are positioned on the ring in such a way as to block the positions ortho and para to the hydroxyl group.

These compounds readily polymerize to form linear polymers having the general structure:

(VI)
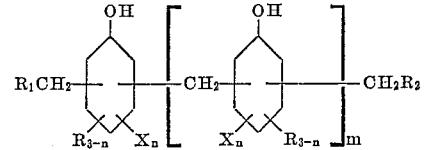

wherein $m$ is a number representing the number of units enclosed by the brackets in the chain, and $n$, R, $R_1$, $R_2$ and X are as before, in (V).

The X, R, $CH_2R_1$, $CH_2R_2$ groups may be the same or different.

In the $R_1$ and $R_2$ ester and ether groups of the type $R_5O$, $R_6O$, $R_7COO$, and $R_8COO$, $R_5$, $R_6$, $R_7$ and $R_8$ can be any straight or branched saturated or unsaturated aliphatic hydrocarbon radical having from one to about eighteen carbon atoms. Typical groups are, for example, methyl, ethyl, propyl, isopropyl, butyl, tert-butyl, sec-butyl, amyl, nonyl, undecyl, tridecyl, pentadecyl, heptadecyl, oleyl, octadecyl, and hexenyl.

R can be alkyl, alkylene, aryl, or cycloalkyl, for example, propyl, isopropyl, butyl, isobutyl, sec-butyl, t-butyl, amyl, isoamyl, t-amyl, hexyl, heptyl, octyl, 2-ethyl hexyl, isooctyl, tert-octyl, nonyl, isononyl, dodecyl, octadecyl, propenyl, hexenyl, octenyl, oleyl, decenyl, eicosyl, phenyl, benzyl, α-methyl benzyl, dimethylbenzyl, dimethylphenyl, tolyl, xylyl, cyclohexyl, cyclopentyl and naphthyl.

These compounds are useful as vulcanizing agents for diolefin polymers, such as butyl rubber, as is set forth in copending applications Serial Nos. 819,005, filed June 9, 1959, Kordzinski et al., 813,367, filed May 15, 1959, Kordzinski et al., 817,721, filed June 3, 1959, Kordzinski et al.

The reaction product will usually contain a mixture of monocyclic and polycyclic phenol dialcohols.

From 0.015 to 1.1 moles of volatile organic base is used per mole of phenol, and the amount of formaldehyde will be stoichiometric plus a slight excess. To prepare the monomer from the phenol, from 1.5 to 2.2 moles of formaldehyde is used per mole of phenol, 2 moles of formaldehyde reacting with each mole of phenol. The polymer is formed of phenol and formaldehyde in an approximately 1:1 ratio and a smaller proportion of formaldehyde therefore can be used. The range will usually be from 1 to 2.2 moles of formaldehyde per mole of phenol.

The reaction is carried out in aqueous solution desirably with an added water-miscible organic solvent, if necessary, to completely solubilize the phenol and organic base in the reaction mixture, if these are not soluble in water. The reaction is usually conducted under reflux at atmospheric pressure and is complete within from one to five hours.

Usually the reaction temperature will range from 25 to 125° C., preferably from 70 to 110° C.

If the product is precipitated from the reaction mixture in crystalline form, it can be separated by filtration or centrifuging. The polymeric products usually separate out as an oil phase, and then the reaction mass is dehydrated preferably under vacuum, or if desired, the oil phase may be separated from the reaction mass in conventional manner and thereafter dehydrated. During the course of dehydration the volatile amine is substantially removed. Thus, there is no necessity of a neutralization by addition of acid or a water wash to remove the salt resulting from the neutralization, as is the case when inorganic alkaline catalysts are used.

The following examples in the opinion of the inventors represent the best embodiments of their invention:

Example 1

250 g. 2,2'-thiobis(4-methyl phenol) (1.015 moles), 250 g. 2,2'-thiobis(4-tert-octyl phenol) (0.565 mole), 237 g. 44% methanol-free formaldehyde (3.48 moles) and 30 g. triethylamine (0.297 mole) were reacted at atmospheric reflux for one hour. The molar ratio of the total phenols to formaldehyde was 1:2.2, and the triethylamine corresponded to a concentration of 60 parts/1000 parts of total weight of phenols charged. Of the phenols charged the 2,2'-thiobis(4-methyl phenol) represented 64.2 molar percent and the 2,2'-thiobis(4-tert-octyl phenol) represented 35.8 molar percent.

The condensation product was dehydrated under reduced pressure to a resin temperature of 120° C. at 28 inches vacuum, and poured on a metal tray to cool.

The cooled resin was a dark, brown-like, hard, transparent product. The yield recovered was 567 g. and the final product had a Nagel melting point of 106° C. and contained 5.2% methylol groups.

Example 2

1000 g. p-tert-octyl phenol (4.85 moles), 663 g. of 44% methanol-free formaldehyde (9.7 moles) and 50 g. of triethylamine were reacted at atmospheric reflux for fourteen hours with agitation.

The molar ratio of the p-tert-octyl phenol to HCHO was 1:2.0, and the catalyst concentration corresponded to 50 parts triethylamine/1000 parts of octyl phenol.

The viscous condensation product was dehydrated under reduced pressure to a resin temperature of 142° C. and 28 inches of vacuum. The dehydrated product was poured on a metal tray to cool. 1140 g. of a clear, transparent, slightly yellow, resinous product was realized having the following physical properties:

Nagel softening point, ° C. _____ 96.8
Percent CH₂OH content _____ 7.74

The product was essentially a mixture of trimers and tetramers as indicated by the following formulae:

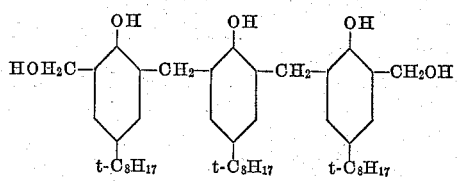

Calculated percent CH₂OH, 8.8

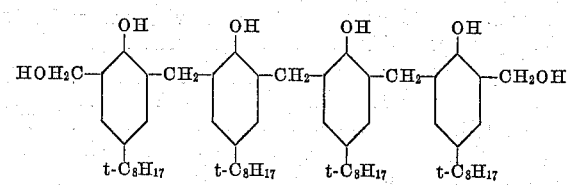

Calculated percent CH₂OH, 6.75

Example 3

1000 g. of meta-tert-butyl phenol (6.65 moles), 906 g. of 44% methanol-free formaldehyde (13.3 moles) and 50 g. of triethylamine were reacted at atmospheric reflux for three hours with agitation.

The molar ratio of the meta-tert-butyl phenol to HCHO was 1:2.0, and the catalyst concentration corresponded to 50 parts of triethylamine/1000 parts of the phenol.

The condensation product was dehydrated under vacuum to a resin temperature of 125° C. and 28 inches of vacuum and held under vacuum at 120-125° C. until a solid product was obtained on cooling a sample from the distillation flask. The dehydrated product was poured on a metal tray to cool. 1225 g. of a solid resinous product was realized.

Nagel softening point, ° C. _____ 98
Specific gravity at 25/25 ° C. _____ 1.00
Percent methylol content _____ 14.6

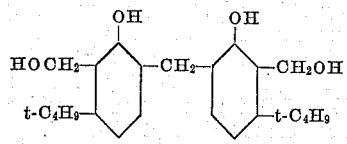

Example 4

1000 g. of 3,5-isopropyl phenol (5.6 moles), 764 g. of 44% methanol-free formaldehyde (11.2 moles) and 50 g. of triethylamine were reacted at atmospheric reflux for four hours with agitation.

The molar ratio of the 3,5-isopropyl phenol to HCHO was 1:2.0 and the catalyst concentration corresponded to 50 parts of triethylamine/1000 parts of the phenol.

The condensation product was dehydrated under vacuum to a resin temperature of 125° C. and 28 inches of vacuum and held under vacuum at that temperature until a solid product was obtained on cooling a sample from the distillation flask. The dehydrated product was poured on a metal tray to cool. 1175 g. of a solid resinous product were realized having the following analysis:

Nagel softening point, ° C. _____ 94.2
Percent CH₂OH _____ 9.3

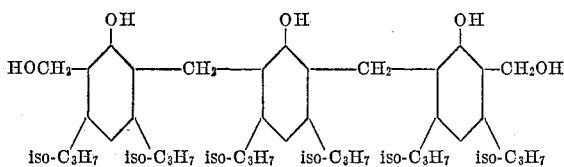

*Example 5*

3000 g. p-tert-octyl phenol (14.6 moles), 1392 g. 44% methanol-free formaldehyde (20.4 moles), and 150 g. triethylamine were reacted at atmospheric reflux for four hours with agitation.

The molar ratio of the octyl phenol to HCHO was 1:1.4, and the catalyst concentration corresponded to 50 parts triethylamine/1000 parts of the phenol.

The condensation product was dehydrated under vacuum to a resin temperature of 130° C. at 28 inches vacuum, and held under these conditions until a melting point of 75–90° C. was attained. The product was poured on a metal tray to cool. A 3200 gram yield was realized. The product had the following properties:

Nagel softening point, ° C. _____ 89
Specific gravity at 25/25 _____ 1.025
Percent CH₂OH content _____ 7.2

The product was essentially a mixture of trimers and tetramers having the following formula:

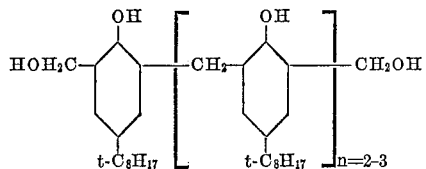

*Example 6*

3000 g. of p-chloro-m-cresol (21.04 moles), 2871 g. 44% methanol-free formaldehyde (42.07 moles) and 150 g. triethylamine (1.48 moles) were reacted at atmospheric reflux for two and one-half hours with agitation. The molar ratio of p-chloro-m-cresol to formaldehyde was 1:2.0, and the catalyst concentration was equivalent to 50 parts/1000 parts of p-chloro-m-cresol.

After the condensation reaction was complete the product was vacuum dehydrated to a temperature of 135° C. at 28 inches vacuum. It was not necessary to neutralize or wash this condensation product because a volatile amine was utilized as a catalyst. The dehydrated product was held at 135° C. at 28 inches vacuum until a Nagel melting point of 70–90° C. was obtained. The product was poured on a metal tray to cool.

The cooled product was a brilliant red, transparent, hard resin. The yield was 3820 g., and the resin contained 15.5% CH₂OH groups, had a specific gravity of 1.343, and a Nagel melting point of 73° C.

The composition of the product was essentially as follows:

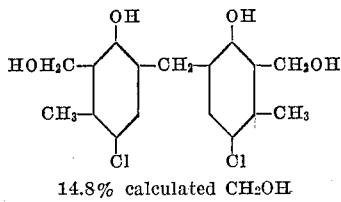

14.8% calculated CH₂OH

*Example 7*

458.2 g. of 3-tert-butyl-5-bromo-phenol (2.0 moles), 300 g. of 44% methanol-free formaldehyde (4.4 moles) and 21 g. of triethylamine (0.2 mole) were reacted at atmospheric reflux for two and one-half hours with agitation.

The condensation product was dehydrated under reduced pressure to a finishing temperature of 125° C. at 28 inches vacuum. The product was poured on a metal tray to cool. The cooled product had the following analysis:

Nagel softening point, ° C. _____ 76
Percent CH₂OH _____ 11.3

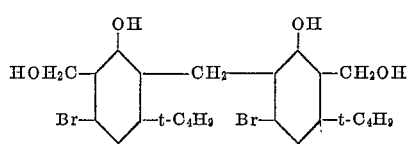

*Example 8*

885.5 g. of 3,4-dichloro-5-methyl phenol (5 moles), 750 g. of 44% formaldehyde (11 moles), 52.5 g. of 100% triethylamine (0.5 mole) added as a 10% solution was allowed to react at reflux for one hour and thirty minutes with agitation. The molar ratio of 3,4-dichloro-5-methyl phenol to formaldehyde was 1:2.20 and the catalyst concentration was equivalent to a mole ratio of 1:0.10 based on the phenol.

The resinous product was dehydrated under vacuum to a final temperature of 123° C. and 25 mm. Hg pressure. The molten product was poured into a glass tray and allowed to cool. 1090 g. of a red-black product was obtained. The following analysis was found:

Nagel softening point, ° C. _____ 90.1
Percent methylol groups _____ 14.0

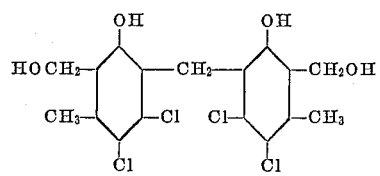

*Example 9*

594.4 g. of bis(4-hydroxy-5-chloro-6-methyl phenyl) methane (2 moles) and 300 g. of 44% formaldehyde (4.4 moles) were reacted in the presence of trimethyl isopropanol ammonium hydroxide (26.8 g.) (0.2 mole) added as a 10% solution for three hours and fifteen minutes.

The resinous product was dehydrated under vacuum to a final temperature of 128° C. and 25 mm. Hg pressure to yield 630 g. of product which was poured into a tray and allowed to cool. The following analysis was obtained on the dark red friable solid:

Nagel softening point, ° C. _____ 92.1
Percent methylol groups _____ 7.9

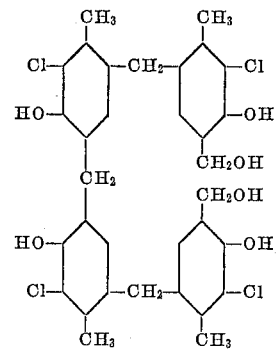

We claim:

1. The process of preparing phenol dialcohols characterized by the presence of reactive methylol groups and substantial freedom from water and alkaline bodies which comprises the steps of mixing together in aqueous solution a phenol selected from the group consisting of phenols directly substituted at the para position and phenols substituted at at least one meta position with a group of sufficient size to sterically block and render non-reactive the adjacent para position, from 1 to 2.2 moles of formaldehyde per mole of phenol and from 0.015 to 1.1 moles of a volatile organic base per mole of phenol which base is non-reactive with the formaldehyde and has a vapor pressure of at least 100 mm. at 150° C. so that the base will be substantially completely volatilized at a temperature below the decomposition temperature of the prepared phenol dialcohols, and which base is selected from the group consisting of tertiary amines having up to about 15 carbon atoms and quaternary ammonium hydroxides which decompose in the subsequent dehydration steps to yield such amines, heating said mixture to a temperature of from 25° C. to 125° C. to initiate condensation between the phenol and the formaldehyde, maintaining said mixture at the temperature of condensation until a resinous phenol dialcohol is formed which is solid at ordinary temperatures, and then without neutralizing the said base heating the mixture to temperatures of up to 150° C. to dehydrate the mixture and volatilize the organic base, thereby producing a phenol dialcohol substantially free of water and alkaline bodies.

2. A process in accordance with claim 1 in which the organic base is a tertiary amine.

3. A process in accordance with claim 1 in which the tertiary amine is trimethylamine.

4. A process in accordance with claim 1 in which the tertiary amine is triethylamine.

5. A process in accordance with claim 1 in which the quaternary ammonium hydroxide is trimethyl isopropanol ammonium hydroxide.

References Cited in the file of this patent

UNITED STATES PATENTS 2,049,447    Honel _____ Aug. 4, 1936

OTHER REFERENCES

Sprung: Jour. Amer. Chem. Soc., vol. 63 (1941) (10 pages).

Sprung et al.: Jour. Amer. Chem. Soc., vol. 71 (1949), pages 2907–13 (7 pages).